T. ADDISON.
Pipe and Hose Coupling.
No. 196,104.                    Patented Oct. 16, 1877.
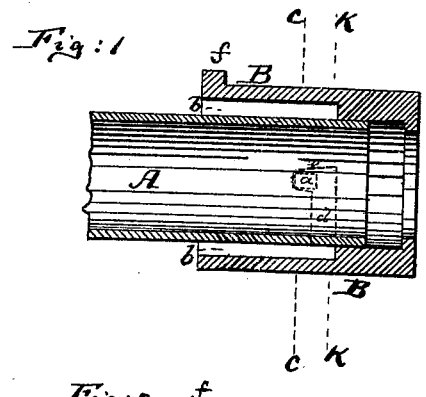
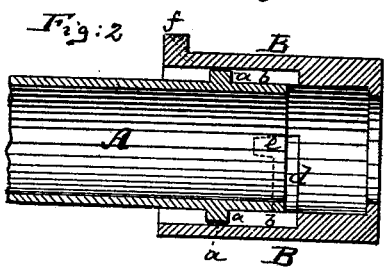
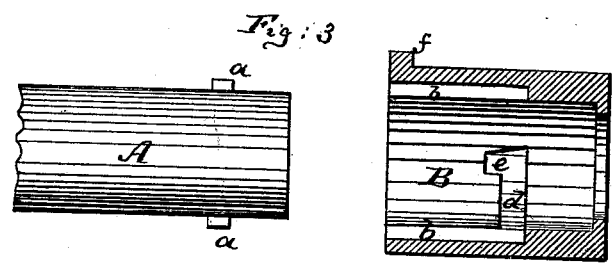
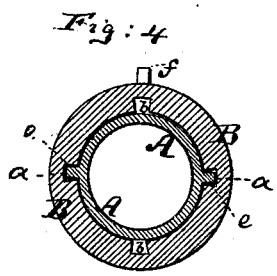
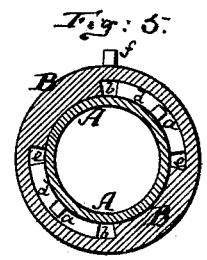
Witnesses:                                    Inventor:

UNITED STATES PATENT OFFICE.

THOMAS ADDISON, OF ELIZABETH, NEW JERSEY.

IMPROVEMENT IN PIPE AND HOSE COUPLINGS.

Specification forming part of Letters Patent No. 196,104, dated October 16, 1877; application filed July 28, 1877.

*To all whom it may concern:*

Be it known that I, THOMAS ADDISON, of Elizabeth, Union county, New Jersey, have invented an Improved Pipe and Hose Coupling, of which the following is a specification:

Figure 1 is a central longitudinal section of my improved coupling, showing the same closed. Fig. 2 is a similar view thereof, showing it partly opened. Fig. 3 is a similar view thereof, showing it entirely opened. Fig. 4 is a cross-section on the line $c\,c$, Fig. 1; and Fig. 5 is a cross-section on the line $k\,k$, Fig. 1.

Similar letters of reference indicate corresponding parts in all the figures.

This invention relates to a new means of connecting two ends of pipe, hose, or tubing; and consists in the peculiar construction of means for locking the two pieces of tube together, all as hereinafter more fully described.

The letter A in the drawings represents the small end of the tubing to be connected. B is the large other end of such tubing. The external diameter of the tube A is substantially equal to the inner diameter of the tube B, so that the former can be slid into the latter. The tube A carries two outwardly-projecting lugs, $a\,a$, which are diametrically opposite each other, and are fastened to or formed on the outer side of the tube A, as clearly shown in Figs. 2 and 3. For the reception of these lugs two straight grooves, $b\,b$, are formed on the interior of the tube B, said grooves extending from one end of the tube B, each into an interior partly-circumferential groove, $d$, which is formed within the bore on the tube B, as shown more particularly in Fig. 3. The grooves $d$ are each about equal to one-fourth of the inner circumference of the tube B. At its terminus each of the grooves $d$ joins a wedge-shaped recess, $e$, which extends from said groove in a direction parallel to the grooves $b$, as indicated in the drawing.

For connecting the two pieces of tubing, the lugs $a$ of the tube A are inserted within the grooves $b$, and pushed up within said grooves as far as they may enter. Thereby the lugs are brought in line with the circumferential grooves $d$, and the tube A may then be turned to bring the lugs $a$ into the grooves $d$ as far as they will go therein. Finally, the tube A is drawn back again, so as to draw the lugs $a$ into the wedge-shaped recesses $e$, binding the lugs therein, and holding the pieces A B securely together.

This coupling is very inexpensive, as the grooves can be formed by casting in the tube B, and it is very readily and quickly put together or separated whenever desired.

By having the recesses $e$ wedge-shaped the coupling is made rigid and reliable, and not apt to play loose while the piping or tubing is in use.

For properly guiding the lugs into the grooves $b$, an index, $f$, is or may be formed on the outer part of the tube B, in line with one of the grooves $b$.

I claim as my invention—

The pipe-coupling consisting of the tube A, having projecting lugs $a\,a$, in combination with the tube B, having the straight grooves $b\,b$, which terminate in the circumferential grooves $d\,d$, that terminate in the wedge-shaped recesses or notches $e\,e$, said recesses projecting at right angles, or nearly so, from the circumferential grooves, substantially as herein shown and described.

THOMAS ADDISON.

Witnesses:
ERNEST C. WEBB,
F. V. BRIESEN.